(12) United States Patent
Spampinato

(10) Patent No.: US 7,440,625 B2
(45) Date of Patent: Oct. 21, 2008

(54) METHOD AND APPARATUS FOR DECODING COMPRESSED AND ENCODED DIGITAL IMAGES

(75) Inventor: Giuseppe Spampinato, Catania (IT)

(73) Assignee: STMicroelectronics S.r.l., Agrate Brianza (MI) (IT)

( * ) Notice: Subject to any disclaimer, the term of this patent is extended or adjusted under 35 U.S.C. 154(b) by 645 days.

(21) Appl. No.: 10/859,064

(22) Filed: Jun. 1, 2004

(65) Prior Publication Data

US 2005/0008233 A1    Jan. 13, 2005

(30) Foreign Application Priority Data

May 29, 2003   (IT) ................ MI03A1079

(51) Int. Cl.
*G06K 9/36* (2006.01)
*G06K 9/46* (2006.01)
*H04N 1/32* (2006.01)
*H04N 7/12* (2006.01)
*H04B 1/66* (2006.01)

(52) U.S. Cl. ............... 382/232; 358/426.16; 348/390.1; 375/240

(58) Field of Classification Search ......... 382/232–253; 358/426.01–426.16; 348/384.1–424.1; 375/240, 375/240.01–240.29, 241
See application file for complete search history.

(56) References Cited

U.S. PATENT DOCUMENTS

| | | | | |
|---|---|---|---|---|
| 4,939,583 A * | 7/1990 | Tsuboi et al. | ......... | 358/426.12 |
| 5,452,101 A * | 9/1995 | Keith | ......... | 382/234 |
| 5,469,273 A * | 11/1995 | Demura | ......... | 382/244 |
| 5,731,840 A * | 3/1998 | Kikuchi et al. | ......... | 375/240.16 |
| 6,219,103 B1 * | 4/2001 | Sugiyama | ......... | 348/452 |
| 2004/0258151 A1 * | 12/2004 | Spampinato et al. | ... | 375/240.03 |

OTHER PUBLICATIONS

Wang, Y.; Wenger, S.; Wen, J.; Katsaggelos, A.K., "Error resilient video coding techniques," Signal Processing Magazine, IEEE, vol. 17, No. 4, pp. 61-82, Jul. 2000.*

Tsekeridou, S.; Pitas, I., "MPEG-2 error concealment based on block-matching principles," Circuits and Systems for Video Technology, IEEE Transactions on, vol. 10, No. 4, pp. 646-658, Jun. 2000.*

* cited by examiner

*Primary Examiner*—Bhavesh Mehta
*Assistant Examiner*—Manav Seth
(74) *Attorney, Agent, or Firm*—Lisa K. Jorgenson; Paul F. Rusyn; Graybeal Jackson Haley LLP (57) ABSTRACT

A method for decoding-decompressing a compressed-encoded digital data sequence relating to at least one compressed-encoded digital image and for providing at least one respective decoded-decompressed digital image.

24 Claims, 9 Drawing Sheets

METHOD AND APPARATUS FOR DECODING COMPRESSED AND ENCODED DIGITAL IMAGES

PRIORITY CLAIM

This application claims priority from Italian patent application No. MI2003A001079, filed May 29, 2003, which is incorporated herein by reference.

BACKGROUND ART

Embodiments of the present invention relate to data decoding-decompression, particularly it relates to a method for decoding-decompressing digital images.

Numerous algorithms are currently known for compressing and encoding both single (or still) digital images, used for example in photographic applications, and digital image sequences, used for example in video applications.

The compression-encoding algorithms make it possible to reduce the quantity of memory required for the storage of the single images or video sequences. These algorithms further make it possible to reduce the bandwidth resources required for the transfer of the images between different devices or for their transmission on telecommunications networks such as, for example, the Internet.

A compression-encoding algorithm transforms a digital image, or a digital video sequence, into a compressed and encoded digital data sequence, such as in the form of a bit sequence (or bit stream).

The most common and efficient compression-encoding methods currently used are based on an operation of transforming the images into a bidimensional spatial frequency domain. Amongst these, numerous methods use the Discrete Cosine Transform (DCT). One example thereof are the compression-encoding methods, for single images, compliant with the international JPEG (Joint Photographic Experts Group) standard and the compression-encoding methods, for video sequences, compliant with the international MPEG (Motion Picture Experts Group) standard such as MPEG-1, MPEG-2, MPEG-4.

Amongst the other standards that use compression-encoding methods based on the DCT transform, we further mention the standards H263 and H26L.

The transformation operation is followed by a subsequent processing, which reduces the informative content of a digital image or a digital image sequence, by operating directly in the spatial frequency domain.

After this processing aimed at reducing the informative content, the images are encoded according to known algorithms, through methods of entropic coding, commonly of the type including a variable length coding (VLC). Huffman coding is, for example, a particular type of entropic variable length coding (VLC) which reduces the number of bits necessary to represent a data set without introducing any loss of information.

The thus compressed and encoded images, or video sequences, are transferred in the form of a bit sequence into storage devices or are remote transmitted, for example they are exchanged between multimedia communication terminals.

The decoding-decompression process, typically inverse to that of compression-encoding, is aimed at the reconstruction of the digital images or video sequences from the compressed and encoded data sequence. For example, the decoding-decompression process is used in applications that require either such digital images or such video sequences to be displayed on a screen.

It is known that a bit sequence, during storage or transmission, can be corrupted, that is, altered by errors.

This problem is particularly felt when the bit sequence is transmitted on radio channels, such as those used in mobile telecommunications and video-communications. The presence of disturbances of various kinds on the channel may vary the value of some bits in the sequence, which may introduce errors.

The decoding-decompression performances of an encoded-compressed bit sequence with methods that use an entropic variable length coding (VLC) are sensitively influenced by the presence of possible errors that have corrupted the bit sequence to be decoded.

This is due, for example, to the fact that certain errors can be such that a code word is erroneously interpreted as another code word with a different length, without the presence of an error being detected in the decoding step. This condition may determine a loss of synchronization in the decoding step.

In this way, even an error in a single bit may entail the loss of a large quantity of data thus producing a significant degradation in the quality of the video or the image.

It has been observed that the state of the art decoding-decompression techniques, for example those compliant with the different standards currently existing, in the presence of errors that alter the compressed-encoded bit sequence, do not ensure satisfactory performances in terms of the quality of the decoded-decompressed image or sequence.

SUMMARY OF THE INVENTION

An embodiment of the present invention provides a decoding-decompression method that is robust towards errors and that is able to provide better performance than the state of the art decoding methods.

This improvement is achieved with a method for decoding-decompression.

A further embodiment of the present invention provides a method for transferring digital images. A further embodiment of the present invention is a multimedia communication apparatus.

BRIEF DESCRIPTION OF THE DRAWINGS

Further characteristics and the advantages of the invention will be better understood from the following detailed description of the various embodiments thereof, being non-limiting examples, in relation to the appended figures, wherein.

DETAILED DESCRIPTION OF SPECIFIC EMBODIMENTS

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

An embodiment of a decoding-decompression method in accordance with the invention that will be described below will refer in a particular, but in a non-limiting way, to the decoding-decompression of a digital data sequence obtained from the compression-encoding of a video sequence in accordance with the MPEG-4 standard.

As far as this is concerned, it should be noted that the teachings of embodiments of the present invention are also applicable to the decoding-decompression of data sequences compressed-encoded with techniques different from the particular method of compression-coding (MPEG-4) to which reference is made for embodiments of the present description.

Particularly, not only is the decoding-decompression method according to an embodiment of the invention applicable to video sequence images, but also applicable to single (or still) images. For example, it is applicable to single images compressed-encoded according to the JPEG standard.

A method according to an embodiment of the present invention is, for example, advantageously usable in new generation multimedia communication terminals or apparatus for transmitting/receiving through a radio frequency signal, compressed-encoded single images, or video sequences. In such terminals, the images and the video sequences are acquired/stored/displayed and transmitted/received using conventional devices and technologies and are therefore evident to those skilled in the art.

A video sequence comprises a series of consecutively acquired images that must be viewed at a preset speed. In accordance with the MPEG-4 standard, the images of a video sequence may be compressed and encoded using three types of compression-encoding algorithms:

I-type (intra-image) compression-encoding, wherein the current image is compressed-encoded independently from the other images of the sequence, exploiting only the spatial correlation inside the image;

P-type (predictive) compression-encoding, in which the current image is coded with reference to an image previous thereto;

B-type (bidimensional) compression-encoding, in which the current image is encoded with reference to a previous image and a subsequent image.

A video sequence compressed-encoded according to the MPEG-4 standard may comprise images compressed and encoded with I-type, P-type or B-type coding interleaved with one another.

As a non-limiting example, in the present description reference is made principally to the decoding-decompression of an MPEG-4 video sequence, in which the images are compressed-encoded with an I-type compression-encoding. The teachings of the present description can be adapted to the case in which the image sequence to decode-decompress also contains images encoded according to the MPEG-4 standard with B- and P-type coding-compression.

Figure 1:
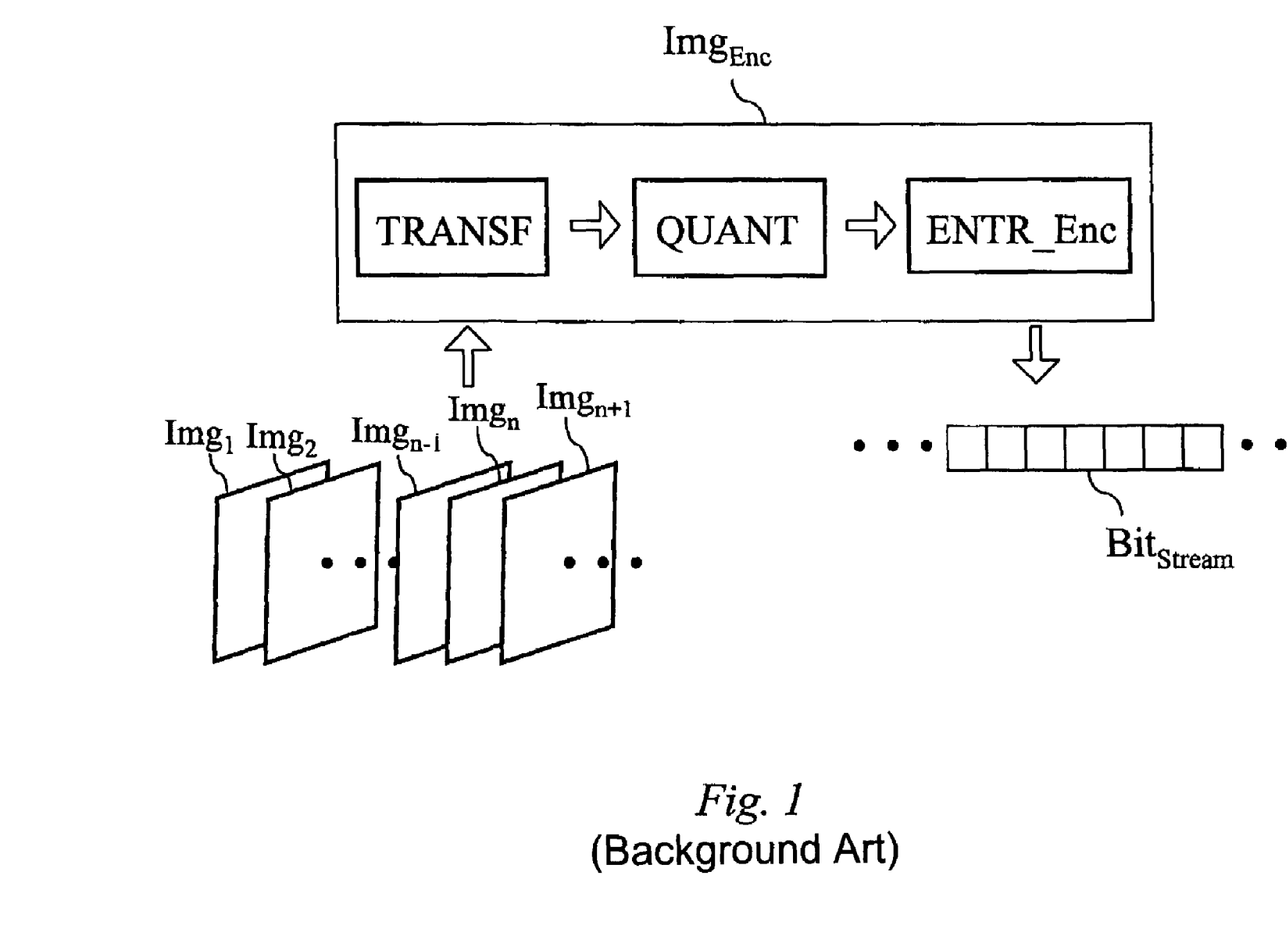
FIG. 1 shows a block diagram relating to a compression/encoding method conform to the MPEG-4 standard.

FIG. 1 represents a block diagram of a compression-encoding method $Img_{Enc}$ conforming to the MPEG-4 standard, for compressing-encoding a digital image sequence by an I-type coding.

As in this type of coding the images are compressed-encoded irrespective of one another, we will consider the case in which the compression-encoding method $Img_{Enc}$ produces, starting from a digital image $Img_n$ pertaining to a video sequence $Img_1, Img_2, \ldots, Img_{n-1}, Img_n, Img_{n+1}$ a digital sequence $Bit_{Stream}$ compressed and encoded in accordance with the MPEG-4 standard.

For a more accurate and detailed description relative to the MPEG-4 standard reference is in any case made to the specification "ISO/IEC JTC1/SC29/WG11 N 2502: Final Draft of International MPEG-4 standard".

As shown in FIG. 1, the compression-encoding method $Img_{Enc}$ comprises a first processing step TRANSF for producing, starting from the digital image $Img_n$, coefficients of a transform in a bi-dimensional spatial frequencies domain. In the specific case of the MPEG-4 standard (but also in other standards such as H263, H26L, MPEG-1, MPEG-2, JPEG), the transform used is the Discrete Cosine Transform or DCT.

For example, the digital images at input to the processing step TRANSF are in YcrCb format. As is known to one skilled in the art, the transformation operation is independently performed on the three components Y, Cr and Cb.

Furthermore, usually, the chrominance components Cr, Cb are sub-sampled before being subject to the transformation step.

Figure 2A:
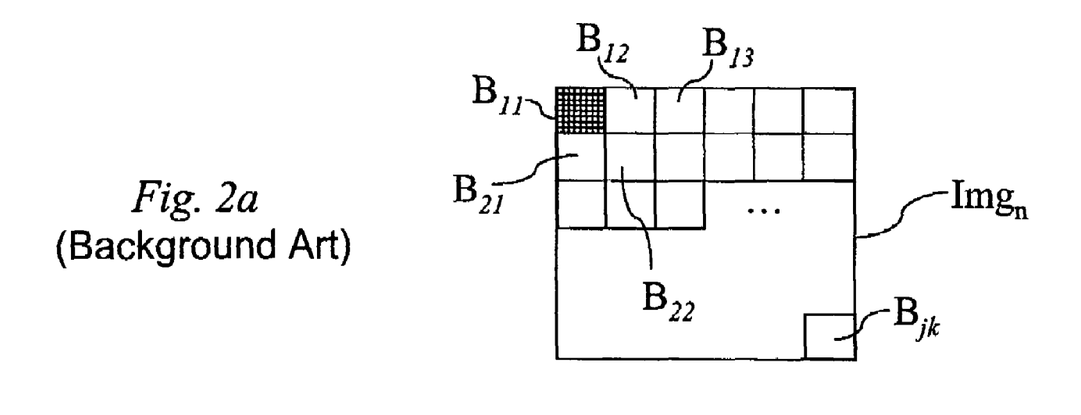
FIG. 2a shows a possible segmentation of a digital image into pixel blocks.

FIG. 2 shows that in order to obtain the transform of the image $Img_n$, in the processing step TRANSF the image $Img_n$ is segmented into a plurality of pixel blocks $B_{11}, B_{12}, \ldots, B_{jk}$, associated to adjacent and not overlapping regions of the image $Img_n$.

Commonly, such blocks are square 8×8 pixel blocks.

Figure 2B:
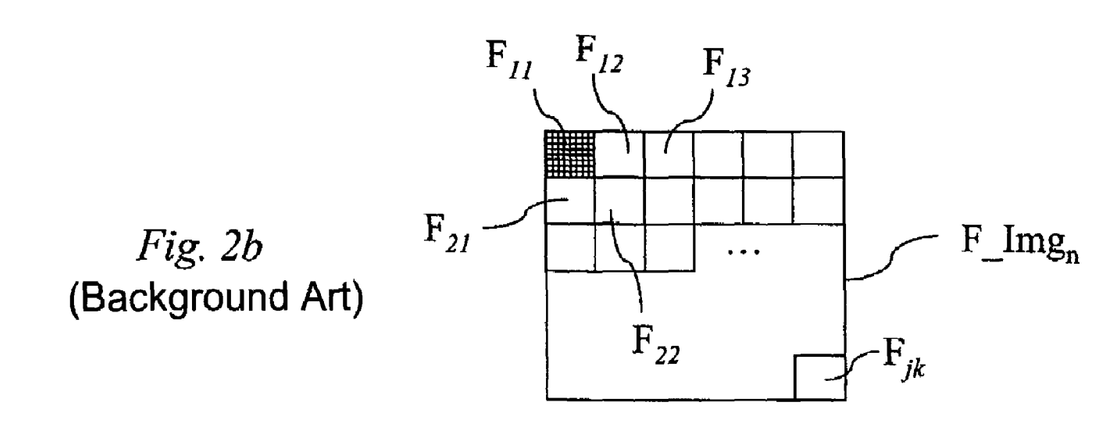
FIG. 2b shows a transform of the image of FIG. 2 into a spatial frequency domain.

The transform in the bi-dimensional spatial frequency domain is performed on these blocks, in this specific example the DCT, in order to obtain a corresponding plurality of blocks $F_{11}, F_{12}, \ldots, F_{jk}$ of transform coefficients.

In the specific case, the coefficients of a block are DCT coefficients and correspond to amplitudes of orthogonal waveforms that define the representation of the block in the bi-dimensional domain of the spatial frequencies DCT.

Henceforth reference will be made to the transform coefficients indicating them more simply with the term "coefficients".

The plurality of coefficient blocks $F_{11}, F_{12}, \ldots, F_{jk}$, as a whole, constitutes a transformed image $F\_Img_n$.

The coefficients are digital values that, according to a preset number of bits used for their digital representation, belong to a range [a, b] of possible digital values, in which "a" and "b" represent the extreme digital values of the range [a, b]. For example, in accordance with the MPEG-4 standard the transformed coefficients are digital values, both positive and negative, represented with 12 bits, therefore pertaining to the range [−2048, 2047].

Figure 3A:
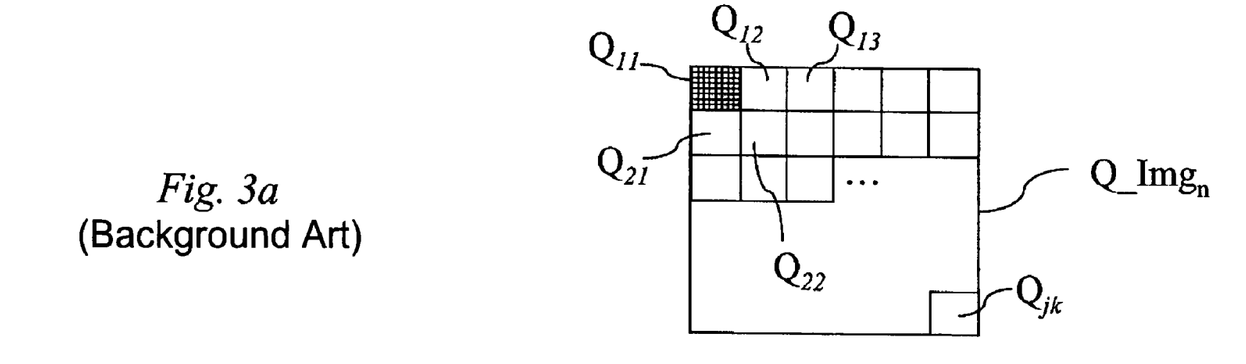
FIG. 3a shows the transform of FIG. 2 after a quantization step.

Returning to the scheme in FIG. 1, the compression-coding method $Img_{Enc}$ comprises a subsequent quantization step QUANT for obtaining from the plurality of blocks $F_{11}$, $F_{12}, \ldots, F_{jk}$ of transform coefficients a corresponding plurality of quantized transform coefficient blocks $Q_{11}, Q_{12}, \ldots, Q_{jk}$ as shown in FIG. 3a.

The quantization step QUANT is such to perform the division, block by block, of every coefficient block for a corresponding integer coefficient, contained in a suitable matrix, known with the name of quantization matrix. Conventionally, the quantization matrix varies according to the component, which is the plane, of the image to be compressed. Besides, for blocks belonging to a same plane, the quantization matrix is obtained by a multiplication step of a same starting quantization matrix for a suitable scalar coefficient, denominated quantization factor, which may differ from one block to another.

Each coefficient, after the division operation, undergoes an operation of rounding up to the subsequent integer number.

In practice, the quantization operation is such to reduce the precision used in the digital representation of the transform coefficients. By varying the quantization factor such precision is reduced to a greater or lesser extent.

Usually, due to the division operation and the subsequent rounding up operation, quantization makes equal to zero many block coefficients, especially those associated to higher spatial frequencies.

Subsequently the quantized transform block coefficients $Q_{11}, Q_{12}, \ldots, Q_{jk}$ are individually subject to an entropic encoding step ENTR_Enc.

Figure 3B:
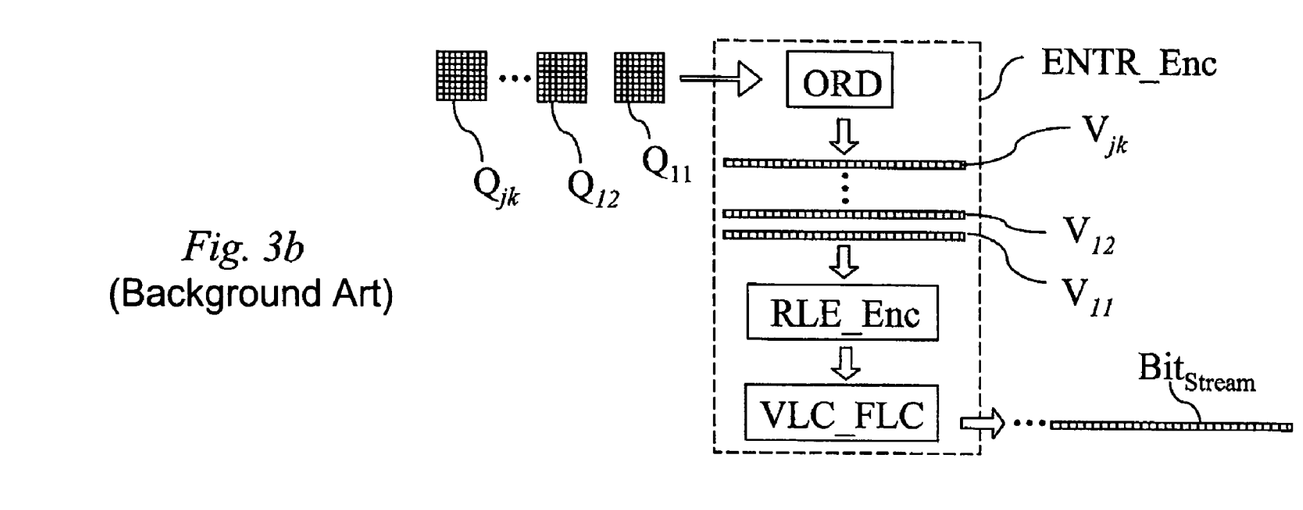
FIG. 3b shows an enlarged detail of the block diagram of FIG. 1.

As shown in FIG. 3b, the entropic encoding phase ENTR_Enc includes a preliminary ordering step ORD of the quantized coefficients, which is performed block by block.

The ordering step ORD generates from each block, or matrix, $Q_{11}, Q_{12}, \ldots, Q_{jk}$ of quantized coefficients a respective vector $V_{11}, V_{12}, \ldots, V_{jk}$ of quantized coefficients, in which the coefficients are substantially ordered according to progressively increasing spatial frequencies.

In this way, starting from a plurality of bidimensional blocks or matrices of quantized coefficients, a plurality of vectors $V_{11}, V_{12}, \ldots, V_{jk}$ is produced in sequence, each one containing the quantized coefficients pertaining to a respective block $Q_{11}, Q_{12}, \ldots, Q_{jk}$.

Two examples of ordering used in the MPEG-4 standard are the ordering according to a "zig-zag" scan of the block coefficients (as in the JPEG case) and the ordering according to a scan order known to one skilled in the art with the name of "alternating zig-zag". The latter has two variants, indicated with "alternating horizontal zig-zag" and "alternating vertical zig-zag".

The ordering step has the purpose of ordering the quantized coefficients of a block so as to obtain a final sequence of coefficients equal to zero, in order to increase the efficiency of the subsequent coding step.

In fact, the coefficient ordering step ORD is followed by an intermediate coding step RLE_Enc with the name of RLE (Run Length Encoding) or "run length", in which the quantized coefficient vectors $V_{11}, V_{12}, \ldots, V_{jk}$ are processed individually.

In this type of coding, instead of using a value for storing each quantized coefficient of a vector $V_{11}$, only the values (called "levels") of the quantized coefficients different from zero and the number (called "run") of previous coefficients equal to zero are stored. Each pair comprising a "level" value and a "run" number constitutes an output symbol produced by the run-length coding.

In a final coding step VLC_FLC the symbols outputted from the intermediate processing step RLE-Enc of "run-length" coding are processed.

The final encoding step VLC_FLC includes a variable length coding operation or VLC. This operation is a reversible processing step for the coding of data and is such to assign shorter code words to statistically more frequently occurring symbols and longer code words to statistically less frequently occurring symbols.

In accordance with coding methods conforming to the JPEG standard, all the "run-length" symbols are encoded by a variable length coding, using standard encoding tables.

In the final coding step VLC_FLC, as occurs in the example in the MPEG-4 standard, in addition to the variable length coding operation, a fixed length coding operation FLC may be performed.

In fact, according to certain compression-encoding methods, for example compliant to the MPEG-4 standard, the final coding step VLC_FLC performs a variable length coding operation for a subset of block symbols (constituted by the combination of a "run" and a "level") having a greater statistical frequency. The variable length coding operation, for example, associates variable length code words to symbols having a greater statistical frequency, by using standard coding tables.

The remaining symbols of the block, i.e. those that are less probable, are encoded with fixed length code words, by using a fixed length coding operation, or FLC (Fixed Length Coding).

For example, the MPEG-4 standard provides, for less probable symbols, the use of a fixed length coding, known by the name of "ESCAPE coding".

Figure 4:
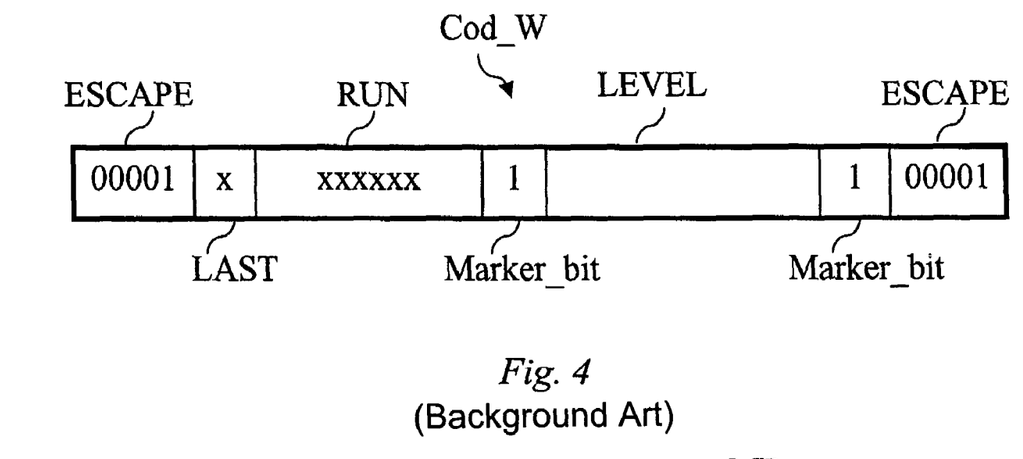
FIG. 4 shows an example of an "ESCAPE" fixed length coding.

The structure of a code word Cod_W that belongs to the output alphabet of an ESCAPE fixed length coding operation is schematically illustrated in FIG. 4, in the case in which this word is destined to be decoded with a Reversible Variable Length Decoding (RVLD).

The first and the last field indicated with ESCAPE, in this example composed by the sequence of bits 00001, are used to signal the start and end of the code word Cod_W.

The second field, indicated with LAST, is composed of one bit and is used to distinguish whether or not the code word is the last of the sequence.

The third field, indicated with RUN, in the example is a sequence of 6 bits that contains the RUN value of an encoded signal with a "run-length" encoding.

Two fields, each one composed of one bit (commonly having value "1"), is used to avoid the emulation of the "marker" of re-synchronization.

Finally, the LEVEL field, composed of 11 bits, contains the values ("level") of the quantized coefficient of the coded "run-length" symbol. In accordance with the MPEG-4 standard, the LEVEL field is constituted by 11 bits in the case in which reversible variable length coding (known by the abbreviation RLVD) is used, otherwise it is constituted by 12 bits.

Figure 5:
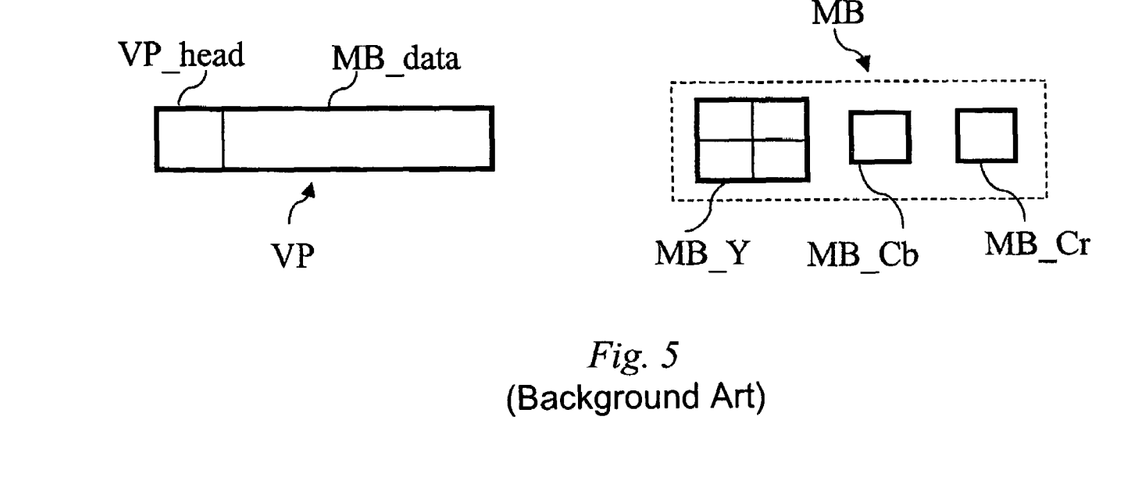
FIG. 5 shows the structure of a video packet and the structure of a macroblock.

As shown in FIG. 5, in the methods in accordance with the MPEG standard, the encoded and compressed data flow $Bit_{Stream}$ is subsequently organized at a hierarchy level into Video "packets" VP. Each packet VP comprises substantially one heading VP-head and comprises a data field MB_data containing data (i.e. quantized and transformed coefficients) relating to a plurality of macroblocks. The structure of a video packet is in reality more complex, but will not be further detailed because it is known to one skilled in the art.

A macroblock MB is, on the other hand, a data structure comprising the compressed and encoded coefficients corresponding to a region of the initial image having dimensions of 16×16 pixels. More in detail, as shown in FIG. 5, a macroblock MB comprises the quantized and encoded coefficients obtained from the compression-encoding of 4 blocks with dimensions of 8×8 of the luminance plane Y, indicated overall by MB_Y. A macroblock MB further comprises the quantized and encoded coefficients obtained from the compression-encoding of two blocks with dimensions of 8×8 indicated with MB_Cb and MB_Cr, pertaining respectively to the chrominance plane Cb and the chrominance plane Cr.

A slightly different, but similar condition, arises in the compression of still images, for example in the methods conforming to the JPEG standard.

In such methods, reference is not made to the video packets VP. However, the quantized and encoded coefficients are organized in structures, similar to the macroblocks described above, known to one skilled in the art by the name MCU (Minimum Compression Unit). The dimensions of such structures depend on the initial sub-sampling of the chrominance planes Cr and Cb.

Figure 6:
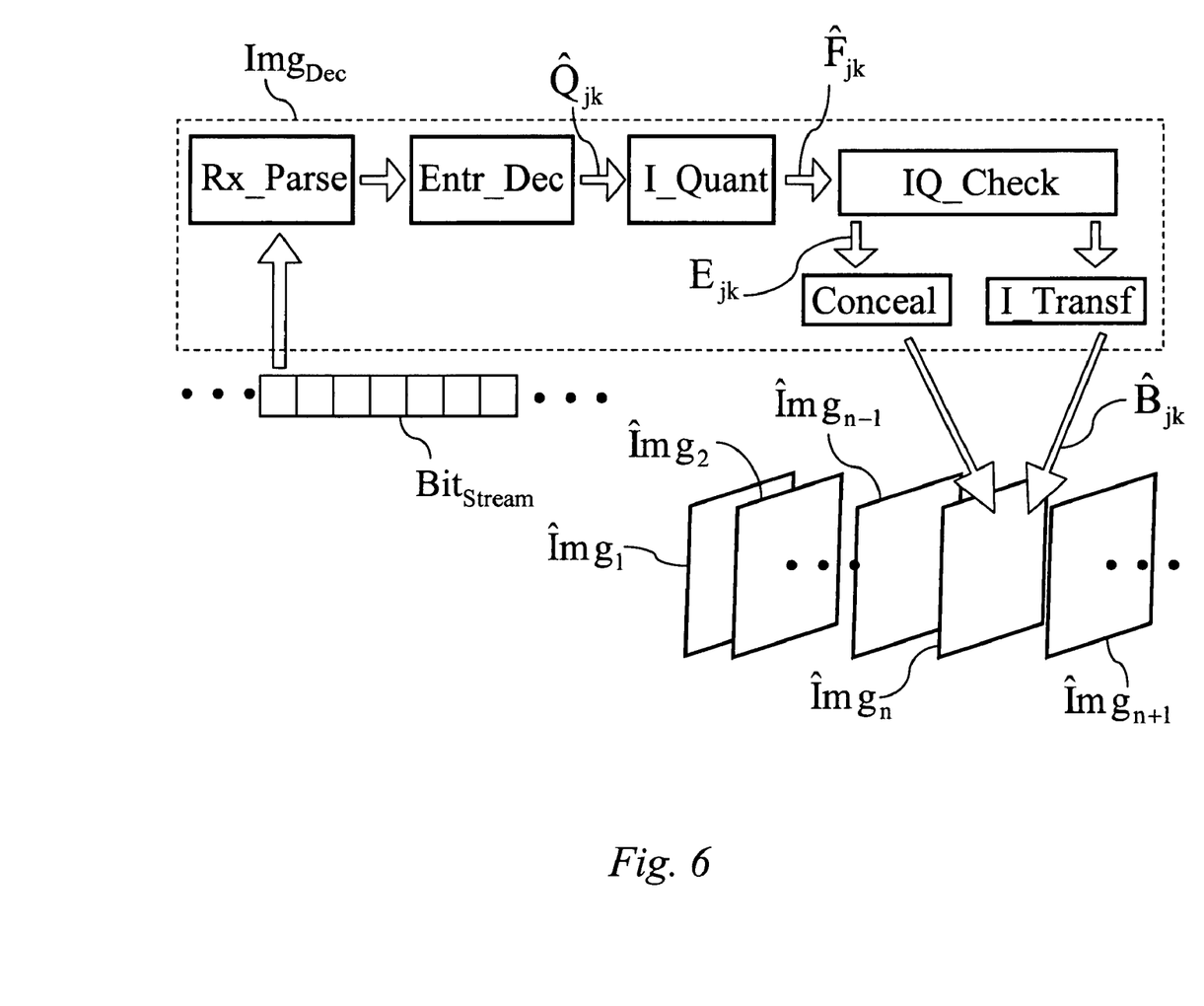
FIG. 6 schematically shows a block diagram relative to a first embodiment of a decoding-decompression method in accordance with the present invention.

With reference to FIG. 6, an embodiment of a decoding-decompression method $Img_{Dec}$ in accordance with the present invention will be described.

In greater detail, the particular decoding-decompression method $Img_{Dec}$ described below refers to the decoding-decompression of a data sequence $Bit_{Stream}$ compressed-encoded in accordance with the MPEG-4 standard, obtained for example, by an I-type compression-encoding MPEG-4, from a sequence of digital images. This means that, for simplicity, in the present description the part of decoding that uses motion vectors and motion compensation, used on the other hand in B-type and P-type image decoding-decompression, will not be dealt with.

In one embodiment, the decoding-decompression method may be implemented by software resident in a telecommunications device, or it can be implemented as a hardware device, or as a suitable combination of hardware and software.

The decoding-decompression method $Img_{Dec}$ comprises an initial parsing step Rx_Parse of the compressed-encoded bit sequence $Bit_{Stream}$. This step includes a series of operations relating to the reception/reading of the compressed-encoded bit sequence. Such reception/reading operations are known to one skilled in the art and therefore will not be further described.

The initial parsing step Rx_Parse further includes a series of analysis operations of the sequence received in order to identify and extract there from initially compressed-encoded data relating to different images and subsequently groups of compressed-encoded data relating to different pixel blocks of the same image.

Particularly, in the case of the MPEG-4 standard, or more in general the MPEG standard, analysis operations are used to extract from the bit sequence received video packets VP relating for example to an image $Img_n$ and then to extract there from the macroblocks MB, also relating to the image $Img_n$. Subsequently, from the latter, the analysis operations are used to identify and separate compressed-encoded data relating to single 8×8 pixel blocks of the same image $Img_n$.

Also the analysis operations are known to one skilled in the art and are commonly indicated with the term "parsing".

Figure 7:
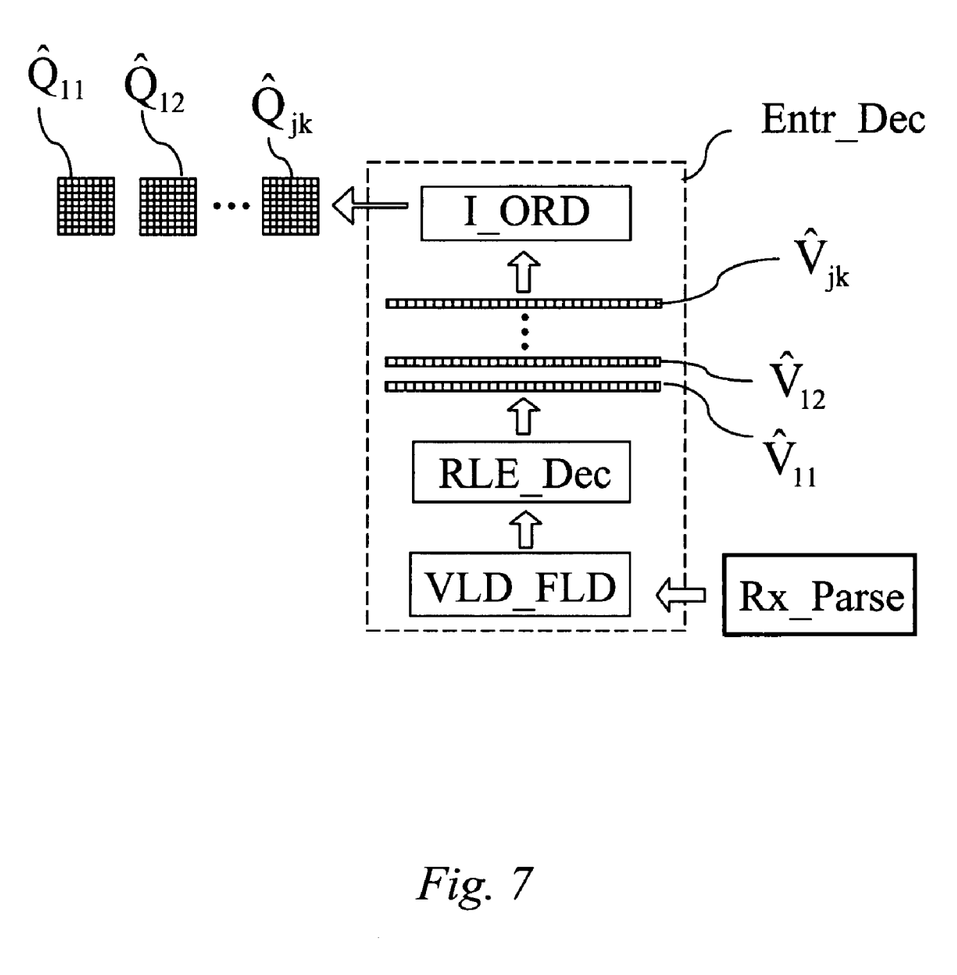
FIG. 7 shows an enlarged detail of the block diagram of FIG. 6.

The decoding-decompression method $Img_{Dec}$ comprises a subsequent entropic decoding phase Entr_Dec, shown in greater detail in FIG. 7. This phase, preferably, operates on the data of the compressed and encoded bit sequence, relating to individual 8×8 pixel blocks, in order to produce at output blocks $\hat{Q}_{jk}$ of quantized transform coefficients.

Particularly, the entropic decoding step Entr_Dec includes a first processing step VLD_FLD suitable to perform a variable length decoding operation. The variable length decoding operation is performed, preferably, in a known way, through the use of a decoding table, in order to produce at output, for each individual block, quantized transform coefficients preferably in the form of "run-length" symbols.

In an alternative embodiment, as occurs in decoding in accordance with the MPEG standards, the first processing phase VLD_FLD is also suitable to perform a fixed length decoding operation, for decoding coefficients that in the respective blocks have a lower statistical occurrence and thus are compressed-encoded with a fixed length coding (FLC).

The fixed length decoding operation is performed preferably in a known way, for example, through the use of an "ESCAPE" decoding, in order to provide as output, quantized transform coefficients preferably in the form of "run-length" symbols.

In the embodiment in which from the first processing step VLD_FLD quantized transform coefficients are produced as output in the form of "run-length" symbols, the entropic decoding step Entr_Dec includes an intermediate RLD (Run Length Decoding) decoding step for producing vectors $\hat{V}_{jk}$ comprising quantized coefficients ordered substantially according to increasing spatial frequencies.

In the embodiment represented in FIG. 7, the entropic decoding step Entr_Dec includes a final inverse ordering step I_ORD that enables to reorder the quantized coefficients of each vector $\hat{V}_{jk}$ in a data structure in the form of a block $\hat{Q}_{jk}$, or matrix, of quantized coefficients. The inverse ordering operation I_ORD corresponds to an inverse operation to that of ordering ORD performed during compression-encoding.

If, during the entropic encoding step ENTR_Enc, or during the transmission of the compressed-encoded data sequence $Bit_{Stream}$, or the storing thereof on a physical memory medium or, again, during the entropic decoding step Entr_Dec errors occur, the quantized coefficient blocks $\hat{Q}_{jk}$ provided as output by the entropic decoding step do not coincide with the corresponding blocks of quantized coefficients $Q_{jk}$ provided as output from the quantization step in the compression-encoding procedure.

Returning to the diagram in FIG. 6, the blocks of quantized coefficients $\hat{Q}_{jk}$ outputted from the entropic decoding step Entr_Dec are subject to a dequantization, or inverse quantization, step, indicated in the figure with I_Quant. The latter is performed according to conventional techniques and will not be further described.

The inverse quantization step I_Quant provides from blocks of quantized coefficients $\hat{Q}_{jk}$ respective blocks of dequantized coefficients $\hat{F}_{jk}$.

Due to both potential errors and the loss of information intrinsic to the non-reversible process of quantization/inverse quantization, the blocks of dequantized coefficients $\hat{F}_{jk}$ supplied as output from the inverse quantization step I_Quant do not coincide, with the corresponding blocks of transform coefficients $F_{jk}$ supplied as output from the transformation step TRANSF in the compression-encoding procedure $Img_{Enc}$.

As shown in FIG. 6, the decoding-decompression method $Img_{Dec}$ further includes an error check step IQ_Check on the dequantized coefficients.

In an embodiment, the error check step IQ_Check analyzes the blocks of dequantized coefficients $\hat{F}_{jk}$ supplied as output from the inverse quantization step I_Quant.

In greater detail, the error check phase IQ_Check identifies and selects the dequantized coefficients of each block $\hat{F}_{jk}$ outside a preset range of digital values $I_{Conc}=[L_{val}, H_{val}]$, in which $L_{val}$ represents a minimum digital value, preferably negative, and $H_{val}$ represents a maximum digital value, preferably positive.

Preferably the preset range $I_{Conc}$ is linked to the precision used, during compression-encoding, for the digital representation of the transform coefficients.

Figure 8A:
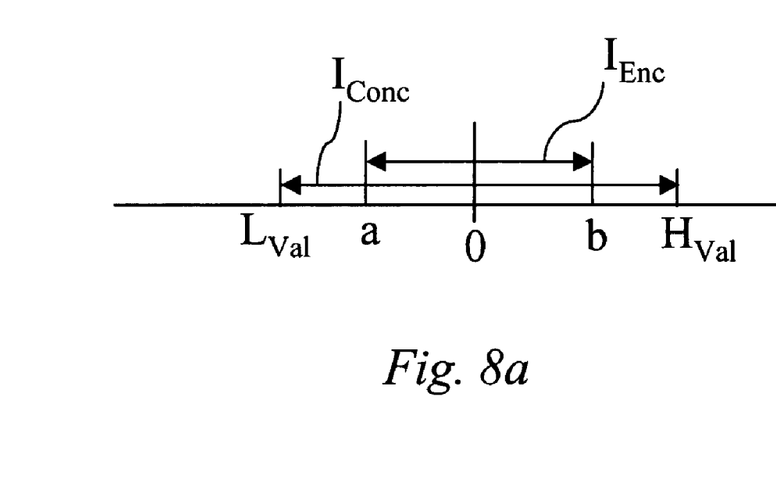
FIG. 8a shows a range of possible digital values for the DCT coefficients and a first preset range of dequantized coefficients.

Particularly, as shown in FIG. 8a, in an embodiment, the preset range $I_{Conc}$ includes the range $I_{Enc}=[a,b]$ of the possible digital values that can be used to represent the transform coefficients in the compression-encoding phase.

More preferably, the preset range $I_{Conc}$ is substantially equal to, or slightly wider than the range $I_{Enc}$ of the possible compression-encoding digital values.

For example, if in the compression-encoding step, after the DCT transformation and before quantization, for the DCT coefficients (with sign) a representation is used on 12 bits (DCT coefficients between −2048 and 2047), in the error check step IQ-Check, a control operation will be performed in order to verify whether the dequantized coefficients of each block $\hat{F}_{jk}$ pertain to the range $[L_{val}=a=-2048, H_{val}=b=2047]$. It has been experimentally verified that this particular choice, that is $I_{Conc}=I_{Enc}$, is optimum in the case of "simple profile" decoding-decompression of MPEG-4 video sequences.

If for a given block $\hat{F}_{jk}$ a dequantized coefficient not within the preset range $[L_{val}, H_{val}]$ is selected, the error check step IQ_Check signals the presence of an error $\hat{E}_{jk}$ in the block $\hat{F}_{jk}$ and initiates a concealment step, indicated in FIG. 6 with Conceal, aimed at concealing the error.

If on the other hand, the presence of an error $\hat{E}_{jk}$ in the block of coefficients $\hat{F}_{jk}$, is not signaled, the error check step IQ_Check is followed by an inverse transformation step I_Transf, of a conventional type, that transforms the block of dequantized coefficients $\hat{F}_{jk}$ into a corresponding pixel block $\hat{B}_{jk}$ of the decoded and decompressed image $\hat{Img}_n$.

The concealment step is aimed at concealing the error. This step includes operations aimed at replacing the information identified as corrupted by errors with other replacement information that in some way masks, discards or conceals the errors, thus avoiding, for example, the production of unpleasant artifacts in the decoded and decompressed image $\hat{Img}_n$.

It should be pointed out that, as the detection of an error is performed within the spatial frequency domain, it is not possible to know the exact position of the error inside the pixel block to be decoded-decompressed.

For this reason, the coefficient block $\hat{F}_{jk}$ is preferably discarded and replaced and is not subject to an inverse transformation phase.

In the case of a video sequence, the pixel block in the decoded-decompressed image $\hat{Img}_n$ during the concealment step corresponding to the discarded block of coefficients $\hat{F}_{jk}$ is preferably replaced with a motion-compensated pixel block of the previously decoded-decompressed image $\hat{Img}_{n-1}$ of the video sequence.

On the other hand, in the case of the decoding-decompression of a single (or still) image, the pixel block corresponding to the discarded coefficient block is preferably replaced by replacement information obtained from pixel blocks spatially adjacent thereto. For example, the replacement information is obtained as an average, or as a spatial interpolation of adjacent pixel blocks.

Techniques of different types may in any case be used to substitute blocks discarded because of errors.

In one embodiment variant, in the case of a decoding-decompression method for video sequences, the conceal step Conceal discards and replaces, the entire macroblock MB containing the coefficient block $\hat{F}_{jk}$ affected by the error.

This particular latter solution presents an advantage of discarding and replacing an entire macroblock that due to errors present within a block thereof, would certainly be decoded in an incorrect way.

Another advantage is due to the fact that the post-processing algorithms of decoded-decompressed images applied subsequently to the decoding-decompression operate, conventionally, at a macroblock level.

The same principle is applicable for the decoding-decompression of single images, for example compressed according to the JPEG standard. For example, in another embodiment variant, in the case of a decoding-decompression method for single images in the conceal step Conceal aimed at concealing the error, an entire minimum compression unit MCU containing the coefficient block $\hat{F}_{jk}$ affected by error is discarded and replaced.

In an embodiment variant, the error check step IQ_Check detects the presence of an error by analyzing and selecting exclusively coefficients of the coefficient block $\hat{F}_{jk}$ obtained from an initial entropic fixed length decoding FLD step. In fact, the decoding of such coefficients is particularly critical in the presence of errors.

Figure 9:
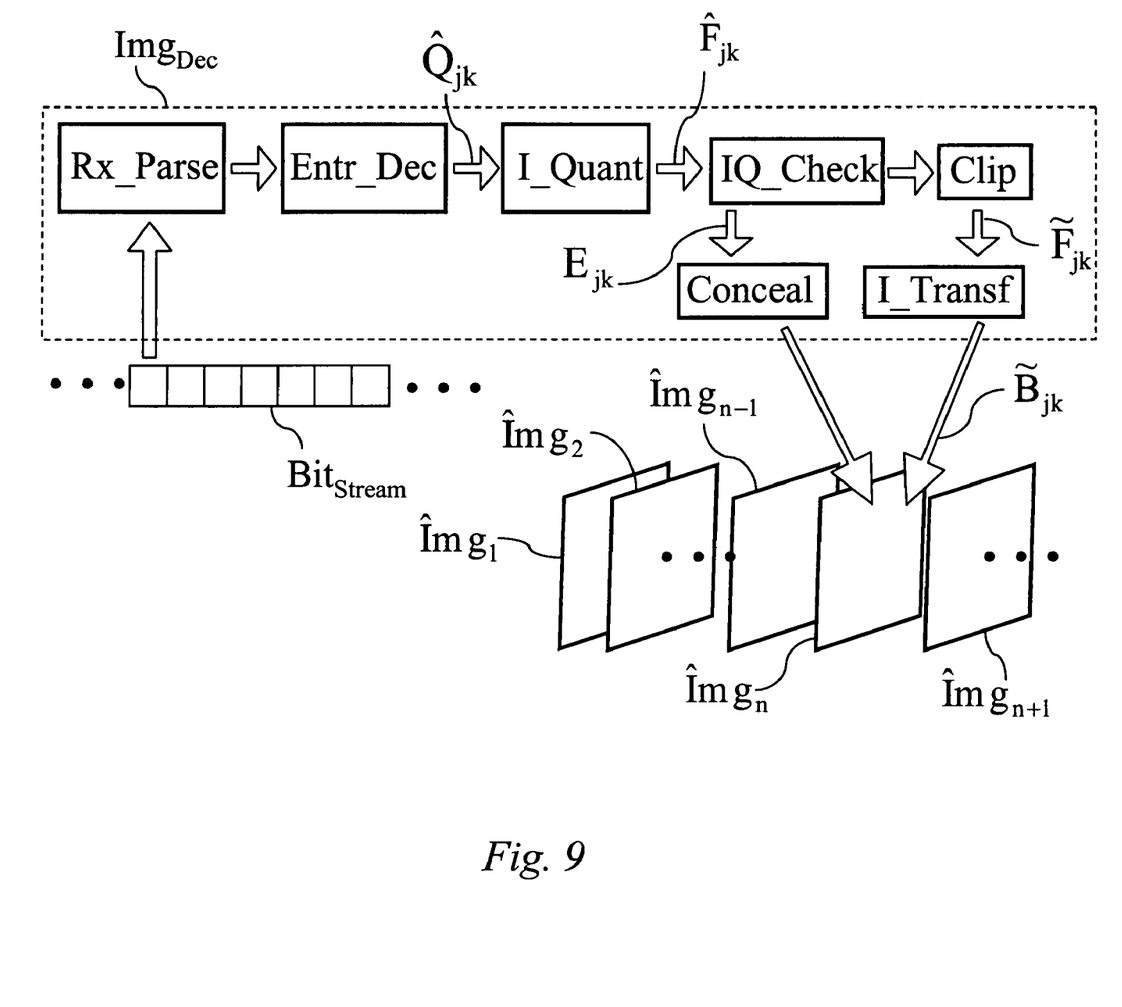
FIG. 9 shows a block diagram relating to an alternative embodiment of a decoding-decompression method in accordance with the present invention.

FIG. 9 shows an embodiment variant of the decoding-decompression method described above and represented in FIG. 6.

In the variant of FIG. 9 the error check step IQ_Check analizes the decompressed coefficient blocks $\hat{F}_{jk}$ supplied on output from the inverse quantization step I_Quant.

Figure 8B:
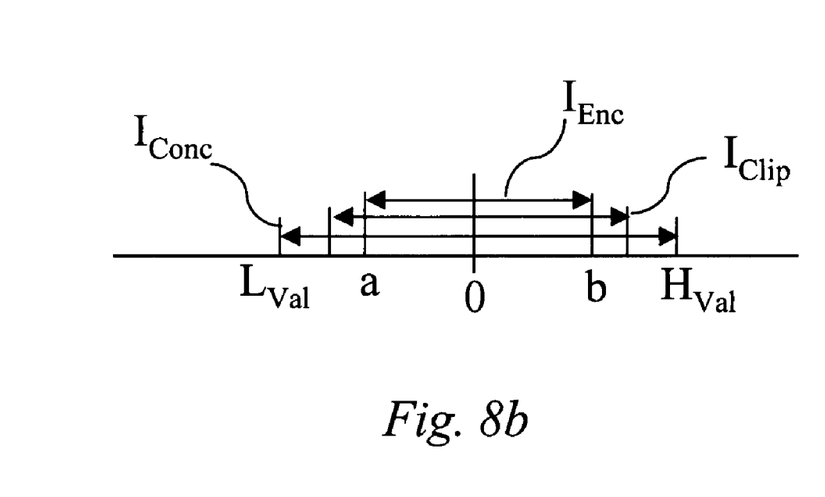
FIG. 8b shows a range of possible digital values for the DCT coefficients, a first preset range of dequantized DCT coefficients and a second preset range of dequantized DCT coefficients

In greater detail, with reference to FIG. 8b, in the error check step IQ_Check a first check operation IQ_Check, is performed, identical to that described previously, in order to select dequantized coefficients for each block $\hat{F}_{jk}$ falling outside a first preset range of digital values $I_{Conc}=[L_{val}, H_{val}]$, wherein $L_{val}$ represents a minimum digital value, preferably negative, and $H_{val}$ represents a maximum digital value, preferably positive.

If for a given block $\hat{F}_{jk}$ a dequantized coefficient is chosen that is not included in the first preset range $I_{Conc}=[L_{val}, H_{val}]$, the presence of an error $\hat{E}_{jk}$ is signaled in the block $\hat{F}_{jk}$ and, therefore, the concealment step Conceal previously described with reference to the embodiment of FIG. 6 is performed.

If, on the other hand, the presence of an error $\hat{E}_{jk}$ in the coefficient block $\hat{F}_{jk}$, is not signaled, a subsequent clipping step Clip selects the coefficients of the block $\hat{F}_{jk}$ to be corrected. In greater detail, the clipping step Clip selects any coefficients within the first preset range $I_{Conc}$ and outside a second range of digital values $I_{Clip}$, included in said first range $I_{Conc}$.

Preferably the clipping step Clip, performs a clipping operation, equaling each coefficient selected for the correction to the respective nearest extreme of the second range.

The corrected dequantized coefficient block $F_{jk}$, produced by the clipping step Clip is subsequently subject to the inverse transformation step I_Transf, which produces a corresponding corrected pixel block $B_{jk}$ of the decompressed-decoded image $\hat{Img}_n$.

Experimental results have shown that the decoding-decompression method in accordance with embodiments of the present invention provides significant increase in performance, in terms of quality of the decoded-decompressed images, in relation to conventional decoding-decompression methods.

Figure 10:
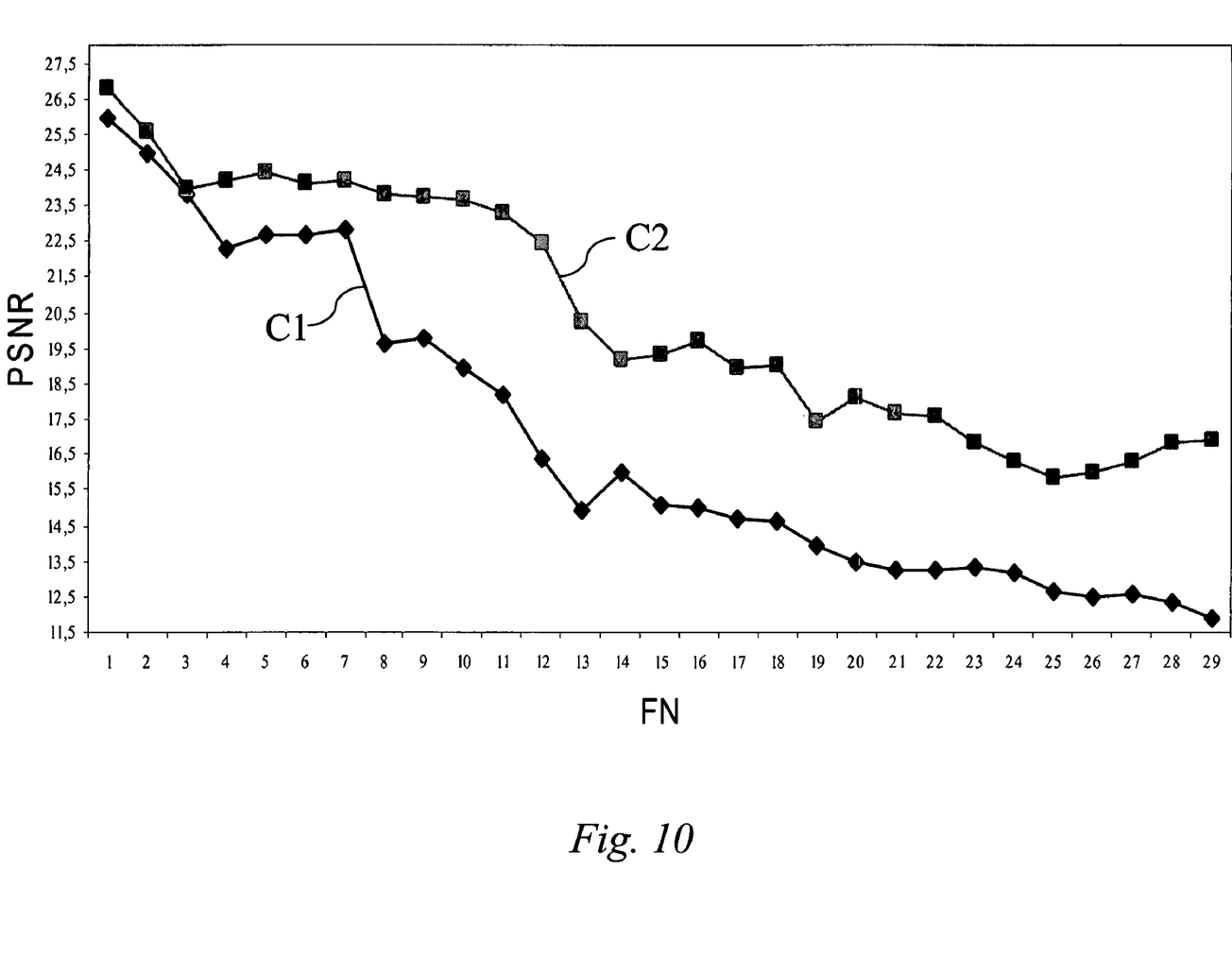
FIG. 10 shows an experimental graph relating to the comparison of performance between a decoding-decompression method according to an embodiment of the present invention and a conventional method.

The graph shown in FIG. 10 refers to the decoding-decompression of a 128 Kb/s video sequence, containing errors and compressed-encoded in accordance with the Simple Profile MPEG-4 standard with reversible variable length coding RVLC.

The abscissa shows the position of each image in the sequence. That is, FN=1 corresponds to the first image of the sequence.

In the sequence, the first image is coded with I-type compression-encoding, the subsequent images with P-type compression-encoding.

Two curves are traced in the graph. The first of these, indicated with C1, bears a measurement of the quality, in terms of PSNR (Peak-to-peak Signal to noise ratio), of the decoded-decompressed images obtained with a standard decoding-decompression method MPEG-4.

The curve indicated with C2, refers on the other hand to a decoding-decompression method in accordance with embodiments of the present invention and, more particularly, in accordance with a first embodiment described above, that is the one indicated in FIG. 6.

The PSNR measurements made and given on the graph refer to luminance channel Y only.

Obviously, the PSNR values that can be obtained depend on the particular strategy used for concealing errors.

The values given in the graph, refer to the case in which a macroblock of the first image containing an error block is replaced with a macroblock having a constant gray level, whilst a macroblock of any one of the remaining images containing a block with errors is replaced with a macroblock taken from the previous image and motion-compensated.

As shown in the graph in FIG. 10, embodiments of the present invention enables an average improvement to be obtained in terms of PSNR of approximately 4 dB compared to a conventional decoding-decompression method.

Obviously in order to satisfy contingent and specific requirements, one skilled in the art may make numerous modifications and variants to the decoding-decompression method, all being within the scope of protection of this invention, as defined by the following claims.

From the foregoing it will be appreciated that, although specific embodiments of the invention have been described herein for purposes of illustration, various modifications may be made without deviating from the spirit and scope of the invention.

The decoding-decompression methods according to the described embodiments may be implemented in a variety of different types of electronic circuitry, and may be utilized in a variety of different types of electronic systems, such as computer systems, audio/video equipment, personal digital assistants (PDAs), and so on.

What is claimed is:

1. A method for decoding-decompressing digital data thus providing at least one decoded-decompressed digital image corresponding to a respective initial image, the method comprising the steps of:

receiving a digital data sequence obtained from a compression-encoding processing of the initial image;

processing the digital data sequence for obtaining a plurality of dequantized blocks, each dequantized block comprising digital values corresponding to dequantized coefficients of a transform in a bidimensional spatial frequencies domain of a respective pixel block of the initial image;

selecting at least one first dequantized block comprising at least one of said digital values outside a first preset range of digital values, and discarding said first selected block and providing in the decoded-decompressed image a respective pixel block comprising replacement information;

wherein said step of processing the digital data sequence in order to obtain the plurality of dequantized blocks includes an entropic decoding step and a subsequent inverse quantization step, the entropic decoding step including a variable length decoding operation; and wherein said entropic decoding step further includes a fixed length decoding operation and in which part of the digital values of said dequantized blocks are obtained from the variable length decoding operation and part thereof are obtained from the fixed length decoding operation.

2. The method according to claim 1, wherein said selecting step selects exclusively digital values obtained from the fixed length decoding operation.

3. A method for decoding-decompressing digital data thus providing at least one decoded-decompressed digital image corresponding to a respective initial image, the method comprising the steps of:

receiving a digital data sequence obtained from a compression-encoding processing of the initial image;

processing the digital data sequence for obtaining a plurality of dequantized blocks, each dequantized block comprising digital values corresponding to dequantized coefficients of a transform in a bidimensional spatial frequencies domain of a respective pixel block of the initial image;

selecting at least one first dequantized block comprising at least one of said digital values outside a first preset range of digital values, and discarding said first selected block and providing in the decoded-decompressed image a respective pixel block comprising replacement information;

selecting at least one further digital value included in a further dequantized block, the further value being inside the first preset range of values and being outside a second preset range of digital values within said first range; and processing said further block, in order to replace said further value with a respective closer extreme value of said second preset range.

4. The method according to claim 3, wherein said step of processing the digital data sequence in order to obtain the plurality of dequantized blocks includes an entropic decoding step and a subsequent inverse quantization step, the entropic decoding step including a variable length decoding operation.

5. The method according to claim 3, further comprising an inverse transformation step of a second block of dequantized coefficients in order to provide a respective pixel block in the decompressed-decoded image, the second dequantized coefficient block comprising digital values all pertaining to said preset range.

6. The method according to claim 3, wherein said transform is the Discrete Cosine Transform.

7. The method according to claim 3, wherein said replacement information of said respective pixel block is obtained from pixel blocks spatially adjacent thereto.

8. The method according to claim 3, wherein the digital data sequence is obtained from a JPEG compression-encoding operation of the initial digital image.

9. The method according to claim 8, wherein said first dequantized block selected is within a Minimum Compression Unit and wherein said discarding step discards said entire minimum compression unit.

10. The method according to claim 3, wherein the digital data sequence is obtained from an MPEG compression-encoding operation of an initial sequence of digital images, and wherein said method provides a sequence of decoded-decompressed digital images.

11. The method according to claim 10, wherein said first selected block is a block with dimensions 8×8 within a macroblock 16×16 and wherein the discarding step discards the entire macroblock and provides in the decoded-decompressed image four respective pixel blocks with dimensions of 8×8 comprising replacement information.

12. The method according to claim 10, wherein said replacement information comprises a motion-compensated pixel block of a previous image in the sequence of decoded-decompressed images.

13. The method according to claim 3, wherein the digital data sequence is obtained by a H263 or H26L compression-encoding operation of an initial digital image sequence.

14. The method according to claim 3, wherein said preset range is substantially equal to or slightly wider than a range of possible digital values used for a digital representation of transform coefficients in the compression-encoding operation.

15. A method for transferring at least one initial digital image from a first communication terminal, the method comprising the steps of:
   a) compressing said at least one digital image in said first communication terminal by performing the following operations:
      segmenting the initial digital image into a plurality of pixel blocks;
      performing a discrete transform of the pixel blocks into a bidimensional spatial frequency domain, in order to obtain a corresponding plurality of coefficient blocks;
      performing a quantization operation of the coefficient blocks, in order to obtain a plurality of quantized coefficient blocks;
      performing an entropic encoding operation of the quantized coefficient blocks, encoding at least part of the coefficients by means of a fixed length coding and obtaining a digital data sequence;
   b) transmitting said digital data sequence to the second communication terminal;
   c) receiving and decoding-decompressing said digital data sequence in the second communication terminal with a decoding-decompression method according to the steps of:
      processing the digital data sequence for obtaining a plurality of dequantized blocks, each dequantized block comprising digital values corresponding to dequantized coefficients of a transform in a bidimensional spatial frequencies domain of a respective pixel block of the initial image;
      selecting at least one first dequantized block comprising at least one of said digital values outside a first preset range of digital values, and
      discarding said first selected block and providing in the decoded-decompressed image a respective pixel block comprising replacement information;
      selecting at least one further digital value included in a further dequantized block, the further value being inside the first preset range of values and being outside a second preset range of digital values within said first range; and
      processing said further block, in order to replace said further value with a respective closer extreme value of said second preset range.

16. The method according to claim 15, further comprising a step of acquiring said at least one initial digital image by the first communication terminal.

17. The method according to claim 15, further comprising a step of displaying said decoded-decompressed image through the second communication terminal.

18. The method according to claim 15, wherein said transmitting step transmits the digital data sequence on a radio communication channel.

19. A multimedia communication apparatus for decoding-decompressing a digital data sequence and providing at least one decoded-decompressed digital image that corresponds to a respective initial digital image, comprising:
   a receiver circuit operable to receive a digital data sequence including a compressed and encoded initial image;
   a dequantization circuit coupled to the receiver circuit and operable to develop dequantized blocks, each dequantized block having digital values corresponding to dequantized coefficients of a transform of a bidimensional spatial frequency domain of a respective pixel block of the initial image;
   a selection circuit coupled to the dequantization circuit and operable to select a dequantized block having the digital values beyond a preset range of digital values, the selection circuit further operable to select at least one further digital value included in a further dequantized block, the further value being inside the first preset range of values and being outside a second preset range of digital values within the first range and the selection circuit further operable to process the further dequantized block in order to replace the further value with a respective closer extreme value of the second preset range; and
   a discarding circuit coupled to the selection circuit, the discarding circuit operable to discard the selected dequantized block and to substitute a replacement block corresponding to the processed further dequantized block within the decoded-decompressed digital image corresponding to the initial image.

20. The apparatus of claim 19, wherein the selection circuit is further operable to determine if an error is present in the dequantized coefficients.

21. The apparatus of claim 19, wherein the means discarding circuit is operable to generate the replacement block from sequentially adjacent dequantized blocks.

22. The apparatus of claim 19, wherein the dequantization circuit is further operable to determine minimum and maximum digital values such that a preset range is linked to a precision defined during compression-encoding of the digital values of dequantized.

23. An electronic system, comprising:
   a decoding-decompressing circuit operable to decode-decompress a digital data sequence and to provide at least one decoded-decompressed digital image that corresponds to a respective initial digital image, the circuit including,
      a receiver circuit operable to receive a digital data sequence including a compressed and encoded initial image;
      a dequantization circuit coupled to the receiver circuit and operable to develop dequantized blocks, each dequantized block having digital values corresponding to dequantized coefficients of a transform of a bidimensional spatial frequency domain of a respective pixel block of the initial image;
      a selection circuit coupled to the dequantization circuit and operable to select a dequantized block having the digital values beyond a preset range of digital values, the selection circuit further operable to select at least one further digital value included in a further dequantized block, the further value being inside the first preset range of values and being outside a second preset range of digital values within the first range and the selection circuit further operable to process the further dequantized block in order to replace the further value with a respective closer extreme value of the second preset range; and a discarding circuit coupled to the selection circuit, the discarding circuit operable to discard the selected dequantized block and to substitute a replacement block corresponding to the processed further dequantized block within the decoded-decompressed digital image corresponding to the initial image.

24. The electronic system of claim 23 wherein the system comprises a computer system.

* * * * *